United States Patent
Watson

(10) Patent No.: US 12,541,317 B2
(45) Date of Patent: Feb. 3, 2026

(54) REPLICATION CONTROLLER IN A STORAGE ENVIRONMENT

(71) Applicant: Dell Products L.P., Round Rock, TX (US)

(72) Inventor: Thomas L. Watson, Richardson, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/642,929

(22) Filed: Apr. 23, 2024

(65) Prior Publication Data

US 2025/0328273 A1    Oct. 23, 2025

(51) Int. Cl.
*G06F 3/06* (2006.01)

(52) U.S. Cl.
CPC ............ *G06F 3/065* (2013.01); *G06F 3/0604* (2013.01); *G06F 3/0679* (2013.01)

(58) Field of Classification Search
CPC ....... G06F 3/065; G06F 3/0604; G06F 3/0679
USPC .......................................................... 711/162
See application file for complete search history.

(56) References Cited

U.S. PATENT DOCUMENTS

| | | | |
|---|---|---|---|
| 11,770,447 B2 * | 9/2023 | Joseph | H04L 67/06 709/219 |
| 11,809,276 B2 | 11/2023 | Prashant et al. | |
| 11,816,462 B2 | 11/2023 | Kumar et al. | |
| 2006/0271758 A1 | 11/2006 | Innan et al. | |
| 2007/0245116 A1 | 10/2007 | Yamamoto et al. | |
| 2021/0073088 A1 * | 3/2021 | Dharmadhikari | G06F 3/0683 |
| 2022/0092024 A1 * | 3/2022 | Kavaipatti Anantharamakrishnan | G06F 16/182 |
| 2022/0100618 A1 * | 3/2022 | Jain | G06F 11/1464 |
| 2022/0276929 A1 | 9/2022 | Prashant et al. | |
| 2022/0308849 A1 | 9/2022 | Kumar et al. | |
| 2024/0036988 A1 * | 2/2024 | Saraswat | H04L 41/0846 |

OTHER PUBLICATIONS

Github, "Dell Container Storage Modules (CSM)" https://github.com/dell/csm, Accessed Aug. 8, 2022, 3 pages.
N. Yehia, "Kubernetes Self Remediation (AKA Poison Pill)," https://www.openshift.com/blog/kubernetes-self-remediation-aka-poison-pill, Nov. 18, 2020, 4 pages.
N. Yehia, "Poison Pill k8s Node Remediation," https://github.com/poison-pill/poison-pill, Dec. 30, 2020, 2 pages.

(Continued)

*Primary Examiner* — Than Nguyen
(74) *Attorney, Agent, or Firm* — Ryan, Mason & Lewis, LLP

(57) ABSTRACT

Replication techniques in storage environments are disclosed. For example, a method includes provisioning, via a replication controller in a storage environment, one or more volumes that are synchronously replicated across at least two storage arrays. The provisioning is configured to maintain access to the one or more volumes by an application program executing on a host device in response to one of the at least two storage arrays failing, and the failure of the storage array being transparent to the application program executing on the host device while access to the one or more volumes is maintained.

20 Claims, 9 Drawing Sheets

(56) References Cited

OTHER PUBLICATIONS

Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.
G. Saenger et al., "Pod Safety, Consistency Guarantees, and Storage Implications," https://github.com/kubernetes/community/blob/master/contributors/design-proposals/storage/pod-safety.md, Oct. 2016, 10 pages.
Portworx, "Synchronous Disaster Recovery," https://docs.portworx.com/portworx-enterprise/operations/operate-kubernetes/disaster-recovery/px-metro, Accessed Jan. 15, 2024, 3 pages.
G. Oakley, "How Discord Supercharges Network Disks for Extreme Low Latency," https://discord.com/blog/how-discord-supercharges-network-disks-for-extreme-low-latency, Aug. 15, 2022, 17 pages.
S. Boutnaru, "The Linux Process Journey—"md" (Multiple Device Driver)," https://medium.com/@boutnaru/the-linux-process-journey-md-multiple-device-driver-61da73d23c1c, Dec. 22, 2022, 7 pages.
Wikipedia, "mdadm," https://en.wikipedia.org/wiki/Mdadm, Apr. 4, 2024, 4 pages.
die.net, "md(4)—Linux man page," https://linux.die.net/man/4/md, Accessed Apr. 18, 2024, 13 pages.
U.S. Appl. No. 17/970,676 filed in the name of Thomas L. Watson et al. filed Oct. 21, 2022, and entitled "Virtual Container Storage Interface Controller."

* cited by examiner

| Failure Description | Expected Outcome |
|---|---|
| Provision MD volume with 2 replicated legs | Exported - replicated volume provisioned and exported for use by application |
| Provision MD volume with 2 legs, 1 array disconnected | Degraded - volume provisioned with 1 leg ready for use by application (no error) |
| Array connection restored for degraded volume | Exported - the degraded volume is upgraded to two legs (no longer degraded) |
| Normal volume loses connectivity with one array | Degraded while connection lost. Rebuilding initiated after reconnection, followed by Exported (fully functioning state). Rebuild occurs while volume in use with no data loss. |
| Pod using MD volume is decommissioned | Created - volume transitions from the exported state to the created state. Note that if there is lack of connectivity to one or more legs, those legs may not be decommissioned immediately but will be later |
| Deletion of a fully decommissioned volume | The database record of this volume is deleted, as are the array volumes for each leg |
| Deletion of a partially decommissioned volume | Legs in the online arrays are decommissioned. Decommissioning of legs in offline arrays is deferred until they come back online |
| Failure of a K8S cluster with node running a pod using MD volumes | User can start the application on another cluster. HBR will determine the node is down by loss of node lease and array connectivity. Array check not yet implemented |
| Failure of leg that is previously being rebuilt | Should be tolerated |
| Failure of primary leg | Volume becomes inaccessible until primary leg restored |
| Complete loss of etcd database | User can "ingest" the volumes into a new etcd database from existing PVs in the cluster |

REPLICATION CONTROLLER IN A STORAGE ENVIRONMENT

FIELD

The field relates generally to information processing systems, and more particularly to management of storage environments.

BACKGROUND

Information processing systems increasingly utilize reconfigurable virtual resources to meet changing user needs in an efficient, flexible and cost-effective manner. For example, computing and storage systems implemented using virtual resources in the form of containers have been widely adopted. Such containers may be used to provide at least a portion of the virtualization infrastructure of a given information processing system. However, significant challenges arise in managing storage environments, container-based or otherwise, especially in the case of data replication in storage environments with distributed storage arrays, and possibly with a variety of storage array types.

SUMMARY

Illustrative embodiments provide replication techniques in storage environments.

For example, in an illustrative embodiment, a method comprises provisioning, via a replication controller in a storage environment, one or more volumes that are synchronously replicated across at least two storage arrays. The provisioning is configured to maintain access to the one or more volumes by an application program executing on a host device in response to one of the at least two storage arrays failing, and the failure of the storage array being transparent to the application program executing on the host device while access to the one or more volumes is maintained.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide synchronous replication of volumes across multiple storage arrays (or legs) of a storage system to enable applications to seamlessly access volumes despite failure of one or more storage arrays. While such storage management techniques are particularly effective in container-based storage environments, it is to be appreciated that the techniques can be implemented in other storage environments (e.g., virtual machine-based storage environments, bare metal host-based storage environments, etc.).

These and other illustrative embodiments include, without limitation, apparatus, systems, methods and computer program products comprising processor-readable storage media.

BRIEF DESCRIPTION OF THE DRAWINGS

FIG. 5 illustrates a set of failure descriptions and outcomes associated with a replication controller according to an illustrative embodiment.

DETAILED DESCRIPTION

Figure 1:
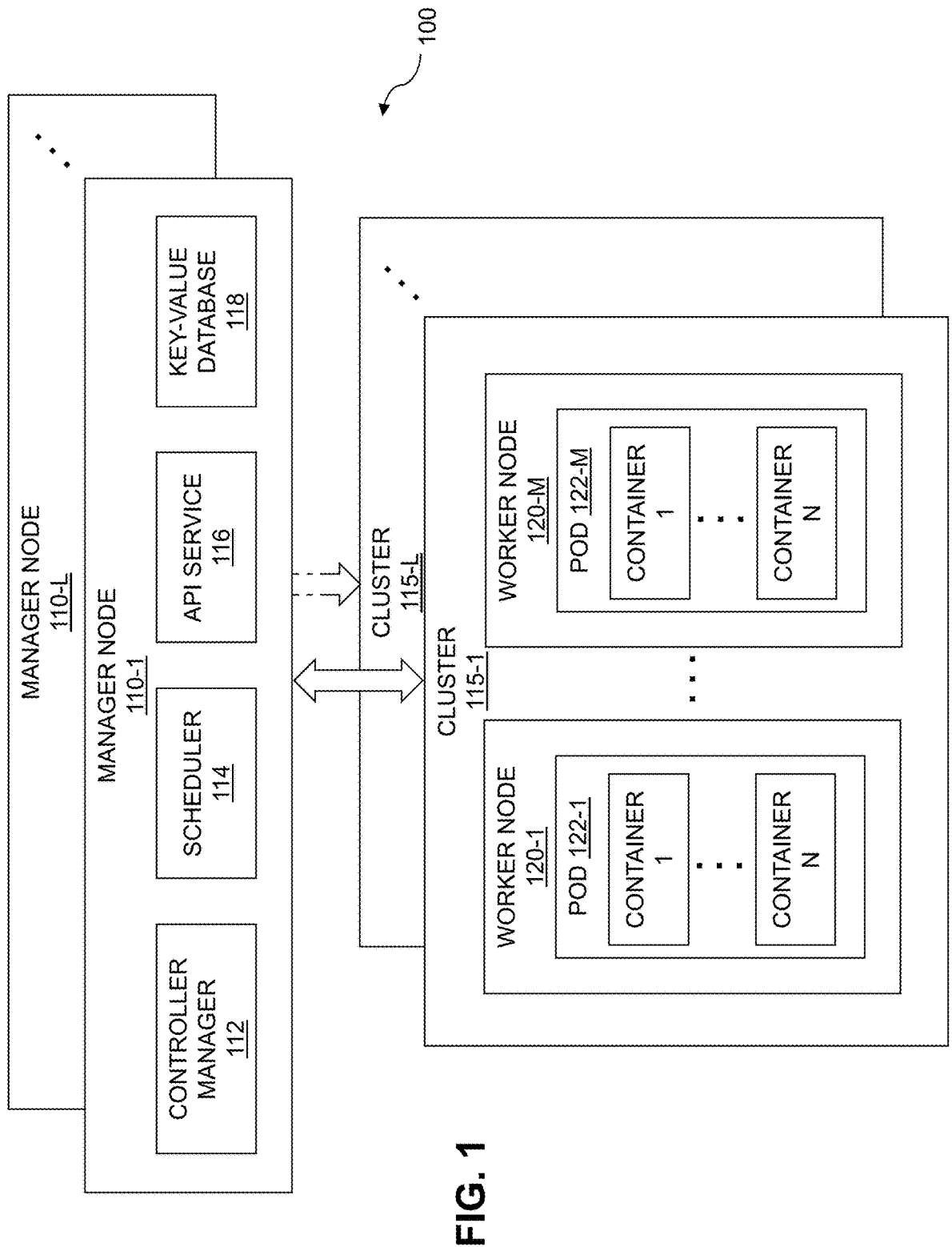
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by at least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of manager nodes 110-1, . . . 110-L (herein each individually referred to as manager node 110 or collectively as manager nodes 110) are respectively operatively coupled to a plurality of clusters 115-1, . . . 115-L (herein each individually referred to as cluster 115 or collectively as clusters 115). As mentioned above, each cluster is managed by at least one manager node.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, . . . . N (each pod may also have a different number of containers). As used herein, a pod may be referred to more generally as a containerized workload. Also shown in FIG. 1, each manager node 110 comprises a controller manager 112, a scheduler 114, an application programming interface (API) service 116, and a key-value database 118, as will be further explained. However, in some embodiments, multiple manager nodes 110 may share one or more of the same controller manager 112, scheduler 114, API service 116, and key-value database 118.

Worker nodes 120 of each cluster 115 execute one or more applications associated with pods 122 (containerized workloads). Each manager node 110 manages the worker nodes 120, and therefore pods 122 and containers, in its corresponding cluster 115. More particularly, each manager node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
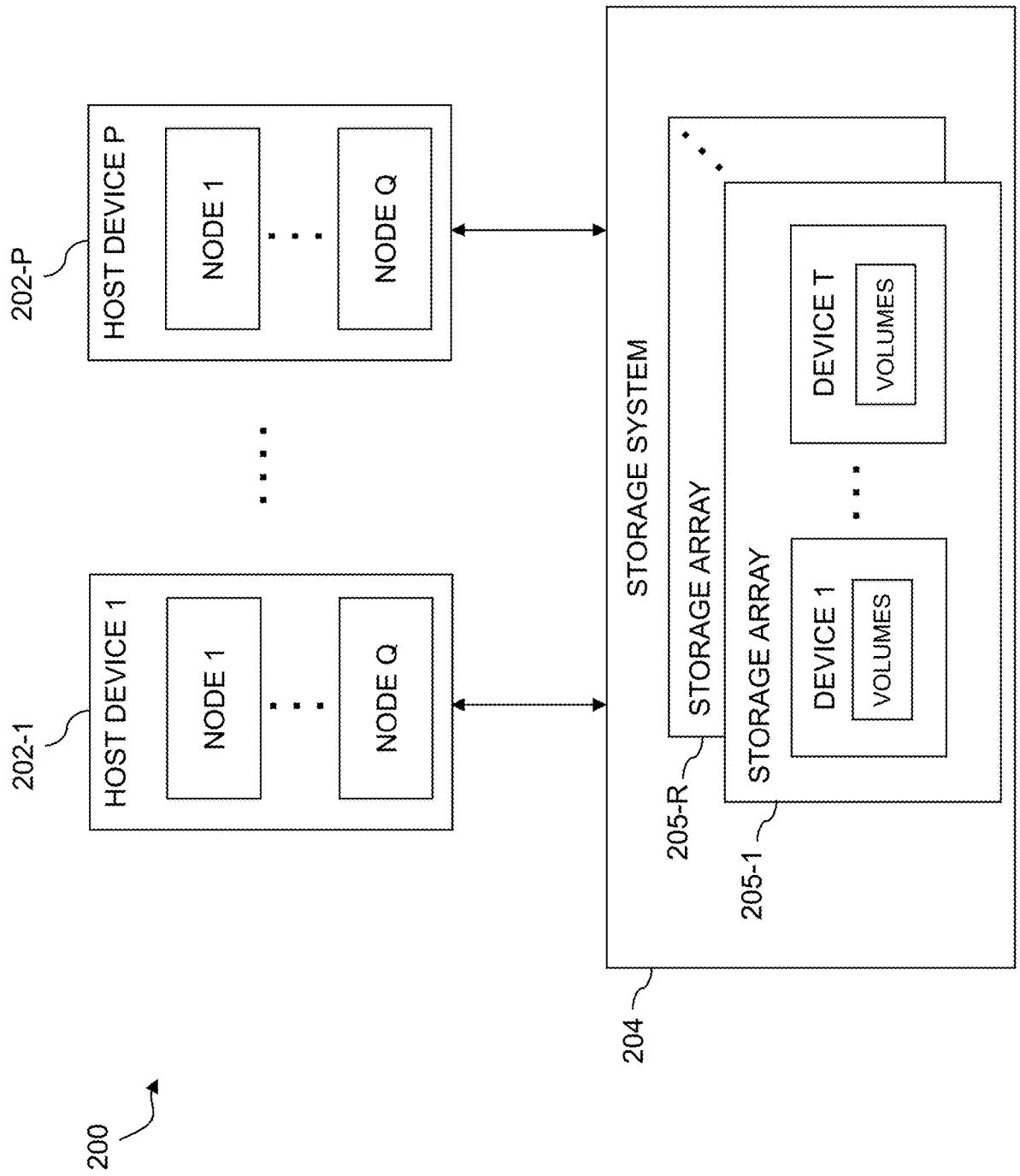
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . . Q. One non-limiting example of a host device 202 is a server. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, . . . . T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . . Q on a given host device 202 can be a manager node 110 or a worker node 120 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . . Q is stored as persistent storage volumes in one or more of the storage devices 1, . . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It is also to be understood that different ones of storage arrays 205 can be configured with different interfaces and/or different semantics and can store different data types (e.g., blocks, files, objects, etc.) Storage arrays 205 can also be different storage products (e.g., storage families, storage platforms, etc.) of one or more different storage vendors.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds). Portions of information processing system 200 may also be part of one or more edge computing platforms.

It is realized herein that within container orchestration environments, such as the pod-based environment of Kubernetes, stateful applications are deployed on top of persistent storage volumes which are typically provisioned by Container Storage Interface (CSI) plugins of respective external storage system vendors (e.g., one or more third-party providers of components of storage system 204). A CSI plugin is typically implemented in Kubernetes as a set of components deployable on any or all nodes (e.g., manager node 110 or worker node 120) and comprises a CSI driver component (CSI driver) and one or more sidecar containers (sidecars). Sidecars typically interact with Kubernetes objects and make calls to the CSI driver to manage Kubernetes events. Sidecars typically include functions such as, but not limited to, an external-provisioner, an external-attacher, an external-snapshotter, and an external-resizer.

CSI plugins are configured to handle block and file data types in the pod-based environment of Kubernetes. However, CSI plugins do not necessarily handle object storage. As a result, Container Object Storage Interface (COSI) was developed as a standard for exposing object storage to containerized workloads running in Kubernetes. Nonetheless, it is to be understood that CSI plugins referenced herein with respect to illustrative embodiments are also intended to include COSI functionalities as may be needed for object-based data replication.

Further, Kubernetes environments have been adapted to operate with Container Storage Modules (CSMs) which are a set of technologies that extend the capabilities of CSI plugins, improving the observability, resiliency, protection, usability, and data mobility for applications which leverage a given vendors storage portfolio. In general, CSMs extend enterprise storage capabilities to the Kubernetes environment. They also reduce management complexity so that developers can consume storage in an independent manner with ease, and can even automate their daily operations such as provisioning, snapshotting, and replication.

An overall goal of our CSI plugins and CSM modules is to make capabilities of storage arrays available to Kubernetes applications, while facilitating the Kubernetes provisioning models that automatically deploy infrastructure (including storage) based on application profiles and storage requirements expressed as code by the application developers. This enables greater efficiency and a broader range of capabilities while still allowing automated storage provisioning.

One technical problem with the current approach is that the provisioning is still generally storage array type specific, because of the differences in interfaces and semantics of different storage arrays. By way of example only, consider Dell Technologies' storage array PowerStore which has a specific CSI plugin which exposes array specific functions such as storage provisioning, replication and snapshotting to Kubernetes. The PowerStore CSI plugin differs from the CSI plugin for Dell Technologies' storage array PowerFlex which uses a different snapshot technology, has different replication capabilities and restrictions, and does not natively support volume clones. Thus, while CSI drivers expose the underlying features of the storage arrays such as replication and consistent snapshots, they are limited by the capabilities of each individual array that is exposed. The storage specific nature of the existing CSI drivers poses technical challenges particularly when providing synchronous replication functionalities.

Illustrative embodiments overcome the above and other technical drawbacks associated with CSI driver-based storage environments by providing synchronous replication across multiple underlying CSI volumes. As illustratively used herein, synchronous replication refers to replication wherein a source volume and a replicated volume (a replication of the source volume) are synchronized such that input/outputs (I/O) are committed in both volumes.

These CSI volumes could represent volumes on disparate types of storage arrays, e.g., block storage across different block storage vendors and/or storage across different types of data, e.g., block, file, object, etc. Thus, replication need not be restricted to a set of homogeneous volume types, but can be across heterogeneous volume types. Additionally, replication functionalities according to illustrative embodiments enable the underlying features available from the various storage arrays, such as their native replication and consistent snapshots, to still be available for use.

Figure 3:
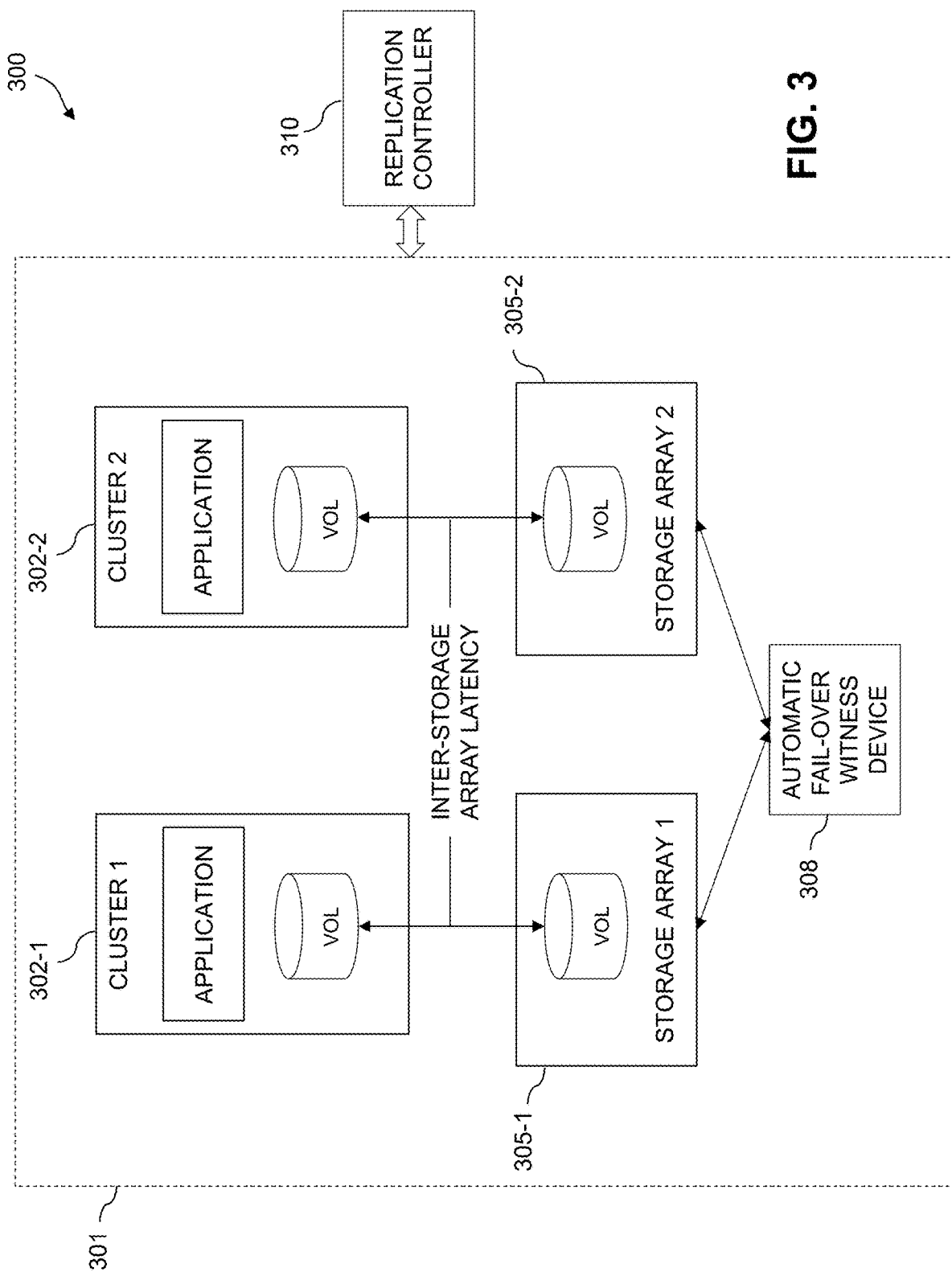
FIG. 3 illustrates an information processing system environment with replication functionalities according to an illustrative embodiment.

Referring now to FIG. 3, an information processing system environment 300 with replication functionalities is depicted according to an illustrative embodiment. More particularly, as shown, information processing system environment 300 includes an information processing system 301 and a replication controller 310. As will be further described below, replication controller 310 is configured with replication functionalities according to one or more illustrative embodiments. While FIG. 3 depicts replication controller 310 as being operatively coupled to, but otherwise outside of, information processing system 301, it is to be understood that in illustrative embodiments, replication controller 310 is implemented, in whole or in part, within one or more components of information processing system 301, while in other illustrative embodiments, replication controller 310 is implemented, in whole or in part, on components separate from components of information processing system 301, as well as some combination thereof.

Further, information processing system 301 is understood to be a non-limiting example of a data center model with which replication functionalities provided by replication controller 310 can be implemented. In this example, as shown, information processing system 301 includes a set of clusters 302-1 (Cluster 1) and 302-2 (Cluster 2) and a set of storage arrays 305-1 (Storage Array 1) and 305-2 (Storage Array 2) respectively connected to clusters 302-1 and 302-2, as well as to one another. In one data center model, it is assumed that cluster 302-1 and storage array 305-1 are located at one site (geographical or otherwise), while cluster 302-2 and storage array 305-2 are located at another site (geographical or otherwise). For example, the two sites can be within a metropolitan area network with a round trip time (inter-storage array latency) of about 10 milliseconds or less. In some embodiments, each of clusters 302-1 and 302-2 are Kubernetes clusters, and each of storage arrays 305-1 and 302-2 are storage specific vendor arrays (by way of example only, PowerFlex storage arrays from Dell Technologies). While information processing system 301 shows a single storage array at each site, it is to be understood that multiple storage arrays can be deployed at each site. Similarly, each site may have more than one cluster.

Additionally, as shown, an automatic fail-over witness device 308 represents an optional third site in the data center model that functions to provide a quorum in a distributed system (e.g., information processing system 301) that employs a key-value store for shared configuration, service discovery, and scheduler coordination of clusters/storage arrays in the distributed system. One example of such a key-value store is an etcd database. An etcd database stores configuration data, state data, and metadata in a Kubernetes orchestration environment. The etcd database can be configured to require a majority of nodes, i.e., a quorum, to agree on updates to state data. For a distributed system with n members, a quorum is (n/2)+1. Thus, in information processing system 301, the site with cluster 302-1/storage array 305-1 can be considered a first member (e.g., with a first etcd node), the site with cluster 302-2/storage array 305-2 can be considered a second member (e.g., with a second etcd node), and the site with automatic fail-over witness device 308 can be considered a third member (e.g., with a third etcd node). The assumption is that information processing system 301 can lose the cluster(s)/storage array(s) on one site, and be able to move one or more applications and/or corresponding data volumes to the cluster(s)/storage arrays(s) of the surviving site (either temporarily or permanently). Thus, in such a failure scenario, one of the clusters can completely fail, along with one of the storage arrays, at the same time, and volumes can still be provisioned, accessed by applications (on a surviving site, in a degraded mode because of no array redundancy), and deprovisioned. For this to be true, the etcd database cannot lose a quorum with all the combined failures. If the quorum is lost, the state data (and thus how the volumes are provisioned) is frozen until the quorum is restored.

Still further, it is assumed that each of clusters 302-1 and 302-2 can access each of storage arrays 305-1 and 305-2. In some configurations, one or more of storage arrays 305-1 and 305-2 can be in logically different sites than the corresponding clusters 302-1 and 302-2. Regardless of the configuration, it is assumed that network latencies appropriate for a metro area network are achievable between all the clusters and all storage arrays.

As mentioned, replication controller 310 is configured to provide replication functionalities in information processing system 301. Thus, instances of an application respectively executing on clusters 302-1 or 302-2 will have volumes (vol) that are synchronously replicated across both storage arrays 305-1 and 305-2 in accordance with replication controller 310. In the event that of one of storage arrays 305-1 and 305-2 becomes unavailable, an application instance can advantageously execute in a manner transparent to the storage array unavailability. When the failed storage array comes online again, in a rebuild process, the data that was changed while the failed storage array was offline is copied from the up-to-date storage array to the previously failed storage array to overwrite the stale data. When the rebuild is complete, full redundancy is available again.

Figure 4:
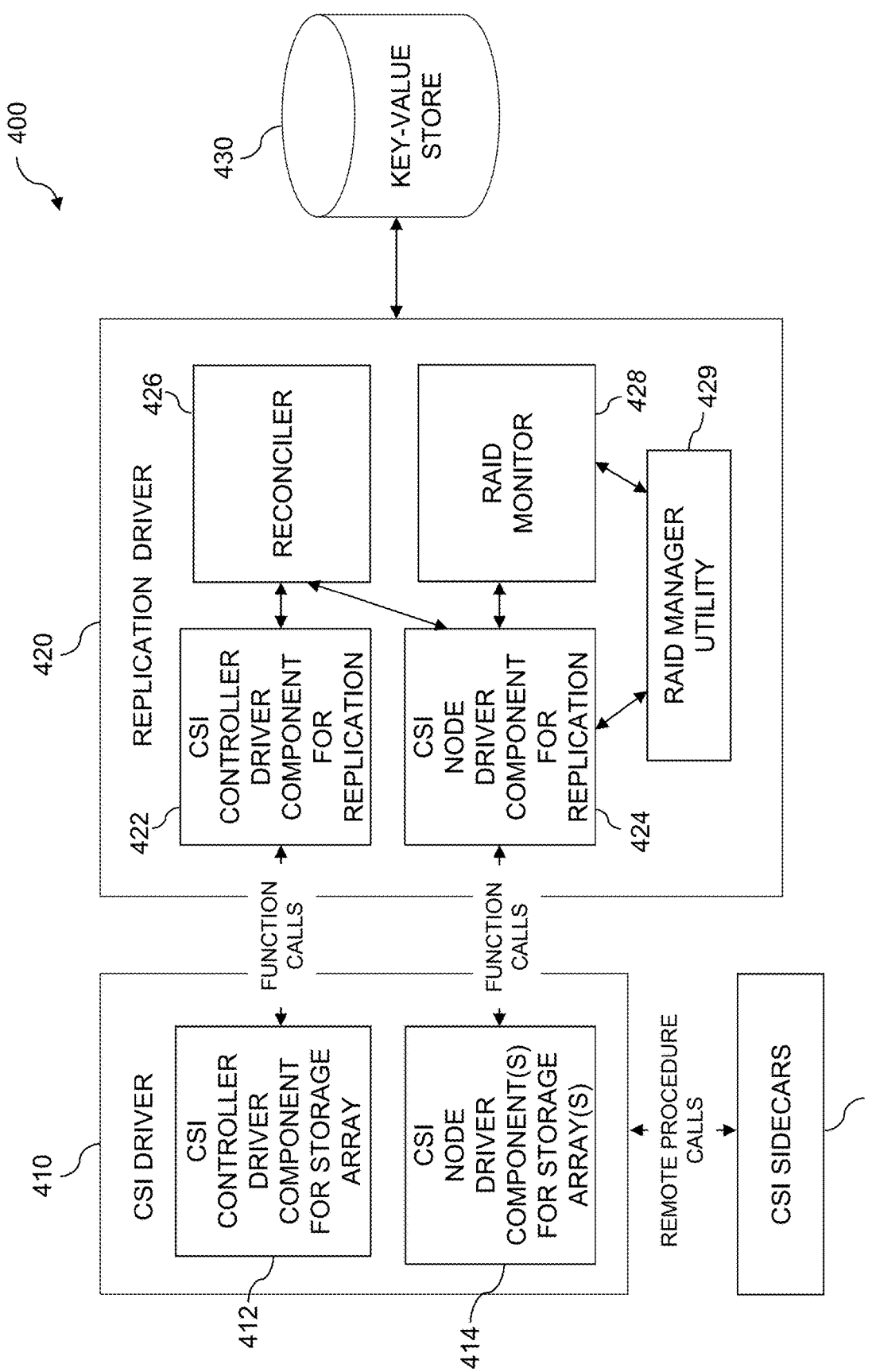
FIG. 4 illustrates an architecture of a replication controller according to an illustrative embodiment.

More particularly, as will be further illustrated in the context of FIG. 4, if the node running the application (e.g., a node in cluster 1) does not fail, but only loses the ability to communicate with one of the two (or potentially more) arrays replicating the volumes it is using, the application does not need to be restarted. Temporarily, the volumes the application is using go to a degraded state, because there are no longer two replicas. I/Os (reads and writes) continue to the remaining array. When the array that was offline returns to service, a RAID monitor function and/or a reconciler function (as will be further described in the context of FIG. 4) will add the volumes' leg for the offline array back and the volumes will go into a rebuilding state where the array that has the most recent data will make sure to copy any data that has not been replicated to the array that went offline (while application I/Os are also being processed). When this process finishes, and the two (or more) copies of the volume are now equivalent again, the volumes exit the rebuilding state and are now normal again. Conversely, if an entire site failed, both the clusters running the application and storage arrays in that site failed, then the application can be started in a cluster in the remaining site, using the surviving replica, in a degraded state. When the other site is restored, the volumes would also go through the rebuild process.

FIG. 4 illustrates an architecture of a replication controller 400 according to an illustrative embodiment. Replication controller 400 can be considered an example implementation of replication controller 310 of FIG. 3. While replication controller 400 will be illustratively described below in accordance with the data center model of information processing system 301, it is to be understood that replication controller 400 is not limited to operating with any specific data center model. For example, storage arrays with which replication controller 400 can provide replication functionalities can include the same type of storage array from the same storage vendor, different types of storage arrays from the same storage vendor, different types of storage arrays from different storage vendors, as well as other storage type configurations. Furthermore, storage arrays can include private storage systems, public storage systems (e.g., cloud platforms), as well as combinations thereof.

Replication controller 400, as shown in FIG. 4, includes two main drivers, i.e., a CSI driver 410 and a replication driver 420. More particularly, in some embodiments, CSI driver 410 is a storage specific CSI driver for one of the storage platforms of a storage vendor. For example, for Dell Technologies, CSI driver 410 can be a storage specific CSI driver for one of their storage platforms including, but not limited to, PowerFlex, PowerMax, PowerScale, PowerStore, Unity, as well as others. Alternatively, CSI driver 410 can be a CSI driver for a cloud-based storage platform including, but not limited to, block, file or object storage from Amazon Web Services (AWS), Google Cloud Platform (GCP), and Microsoft Azure. Still further, CSI driver 410 can alternatively be a virtual CSI (vCSI) driver configured to translate individual requests between storage specific CSI drivers and a singular set of common sidecars.

Replication driver 420, in some embodiments, is implemented by leveraging a Linux kernel driver referred to as a multiple device (md) driver or, simply, md driver. An md driver, in a Linux-based environment, enables virtual storage devices to be created from one or more independent underlying physical storage devices. The md driver is managed by a Linux utility referred to as mdadm utility. For synchronous replication, in one example, a RAID-1 (Redundant Array of Independent Disks) or mirror replication can be selected. Assuming the data center model of information processing system 301, replication is across the two storage arrays 305-1 and 305-2, wherein each storage array can be referred to as a leg.

In some embodiments, the md mirror volumes are provisioned with an internal bitmap that keeps track of which data (e.g., blocks) has not been fully replicated. The bitmap is relatively small (e.g., about 4 KB), thus for large volumes, the chunk sizes that would have to be copied for modified data become large. This facilitates faster rebuilds if only certain segments of a disk have modified data. Note that the bitmap size is configurable and, in some embodiments, is an internal bitmap that resides within the volume itself as part of the file system structure. However, in other embodiments, an external bitmap that can be larger in size is implemented.

In some embodiments, replication controller 400 provides host-based replication. Thus, for example, replication controller 400 can be implemented on each of clusters 302-1 and 302-2 in information processing system 301 (or one or more of host devices 202-1 through 202-P in FIG. 2). While host-based replication may consume more host resources than storage array replication, the amount of resources is moderate. For example, each I/O is issued in parallel to the underlying legs, and the I/O is complete when it has been acknowledged by all the underlying storage systems. Most of the additional load is on the host networking stack to transmit and receive the I/O requests.

Such a host-based replication (HBR) approach using replication controller 400 compares favorably with existing array metro replication because with host-based replication, the writes to the two storage arrays are executed in parallel (with performance determined by the slower array to respond). With existing array metro replication, I/Os are written from the host to a storage array A, which then writes the I/O to a storage array B, storage array B responds to storage array A, and then storage array A responds to the host, so they are at least somewhat serialized.

Another advantage of the host-based replication approach using replication controller 400 is that features provided by the storage array (e.g., consistent snapshots, or their own underlying replication) can be provisioned by requesting one or more of the underlying storage systems to provision the volume appropriately.

Returning now to FIG. 4, as further shown with respect to replication controller 400, CSI driver 410 includes a CSI controller driver component for storage array 412 and a CSI node driver component for storage array 414, while replication driver 420 similarly includes a CSI controller driver component for replication 422 and a CSI node driver component for replication 424. Replication driver 420 also includes a reconciler 426, a RAID monitor 428, and a RAID manager utility 429 (e.g., mdadm utility). A key-value store 430 (e.g., etcd database) is shown operatively connected to replication driver 420, and CSI sidecars 416 are shown operatively connected to CSI driver 410. Note that while FIG. 4 illustrates one CSI node driver component for storage array 414, it is to be appreciated that CSI driver 410 can have many such CSI node driver components depending on the number of nodes and storage arrays that replication controller 400 manages. The interoperability of the above components of replication controller 400 will now be described below.

As mentioned, CSI driver 410 can be implemented based on a CSI plugin associated with the specific storage type of the storage array with which it is associated. Thus, CSI driver 410 can be considered a storage specific CSI driver. In some embodiments, replication driver 420 (e.g., md driver), which can also be considered a CSI driver (csi-md driver), can be implemented in a repository separate from CSI driver 410 (e.g., a Git repository). However, in illustrative embodiments, CSI driver 410 and replication driver 420 can be compiled together into one binary (executable). Each driver component can make function calls to the other, e.g., CSI controller driver component for storage array 412 and CSI controller driver component for replication 422 can make function calls to one another, while CSI node driver component for storage array 414 and CSI node driver component for replication 424 can do the same.

In some embodiments, modifications can be made to a storage specific CSI driver so as to operate as CSI driver 410. For example:

1. Changes can be made to the driver startup procedure of the storage specific CSI driver to enable it to call the driver startup procedure of replication driver 420 and to arrange that interfaces are set up so that each driver component can call the other.
2. Create Volume CSI call can check the storage class used to create a volume by calling a function in replication driver 420 (csi-md driver) to determine if it specifies host-based replication. If so, it calls the replication driver's Create Volume to complete the volume creation. Otherwise, it proceeds normally. Create Volume returns a VolumeId.
3. Other CSI calls (e.g., ControllerPublish Volume, NodePublish Volume, CreateSnapshot, . . . ) determine which path to use by the format of the VolumeId argument passed in. The VolumeId is the unique Kubernetes identifier for a volume. For replication driver 420, the VolumeID is a md-<guid> (e.g., md-f4c6a65c-ee4e-444e-b438-0a791a5007f8), so it is easily distinguishable from CSI driver 410 VolumeIds (e.g., 7ad2b6e84ac1c70f-6d6d90a90000000c is a Powerflex VolumeId consisting of the storage system ID and the volume ID). If the VolumeId is for replication driver 420, CSI driver 410 passes the request to replication driver 420 to handle.

Each of the CSI functions in replication driver 420 (csi-md) generally iterates over the legs of the replication. Each underlying volume that is being used as a replication target is a leg of the overall csi-md volume. The relationships between a csi-md volume and its legs are stored in the etcd entry (e.g., in key-value store 430) for the volume.

CSI operations in replication driver 420 illustratively execute as follows:

1. Acquire an etcd lock to prevent a different cluster from operating on the same volume at the same time. In an illustrative embodiment, the locks are implemented as etcd leases, meaning they have an expiration, which is generally 2× the timeout value for the CSI operation (or 5 minutes if no timeout was indicated). Thus, the locks are global across all Kubernetes clusters and they are automatically released if the node processing the operation crashes when the lease expires.
2. Access the etcd database (key-value store 430) to retrieve the current state on the volume.
3. Validate the operation is valid. Each volume has an owner (cluster-node identifier pair). Operations can generally only be executed by the owning cluster.
4. Iterate through each of the legs, calling the underlying CSI driver 410 to make changes to the volume provisioning on the array, such as volume creation, export, unexport, or deletion.
5. Save the intermediate state for the volume as necessary back to the etcd database.
6. Perform any operations that need to be done across volumes (for example, formatting or configuring the csi-md volume on the node).
7. Saving the final volume state to the etcd database.
8. Release of the lock (handled from a defer statement when the lock was acquired).

Given how replication driver 420 generally interacts with CSI driver 410, as illustratively described above, the components within replication driver 420 will now be further described.

CSI controller driver component for replication 422 is the controller side of replication driver 420 and runs in conjunction with the controller side of CSI driver 410 (i.e., CSI controller driver component for storage array 412). In some embodiments, these controller driver components are run as a deployment, with one or more instances, and the Kubernetes leader election function is implemented so that there is one controller driver active at a time.

Further, in some embodiments, CSI controller driver component for replication 422 handles CSI operations that can be done in a central controller (e.g., does not need access to the target node where the volume is consumed). For example, CSI operations implemented by CSI controller driver component for replication 422 can include: CreateVolume, Delete Volume, ControllerPublish Volume, ControllerUnpublish Volume, and Create VolumeSnapshot. Other CSI operations may be added to these basic operations used for volume provisioning and deprovisioning. On the controller side, a primary focus is to provision the underlying legs on the individual storage arrays so they are ready to be used together to form an md device, or to deprovision them. Create VolumeSnapshot is implemented to create a snapshot on each of the legs. Note that these snapshots on different storage arrays are not at the exact same point in time, but are close. In use cases of VolumeGroupSnapshots, an application should use snapshots from one storage array or the other.

CSI node driver component for replication 424, in some embodiments, implements four primary CSI functions: NodeStageVolume, NodePublish Volume, NodeUnpublish Volume, and NodeUnstage Volume.

NodeStage Volume is an operation that iterates through each of the legs calling the storage array driver (e.g., CSI driver 410) to locate the volume from the storage array and mount it to a staging location.

NodePublish Volume is an operation that makes the volume fully available to a pod (e.g., container on the node). Replication driver 420 iterates through the legs, calling their NodePublish Volume operations to make them available at a specified directory. They are processed by the regular CSI volume as raw block volumes, as the construction of the md device and the formatting and mounting of the md device is handled over the aggregate of all the legs.

Once the volumes for all the legs have all been located, NodePublish Volume begins to form the replicated md volume. In some embodiments, the steps can include:

1. Determine the block device name for each of the legs.
2. Run fdisk on each individual leg block device to partition it. Partitioned md volumes require a specific partition type that indicates a RAID device, e.g., partition type 43. Otherwise, the device will not be accepted by the mdadm command to make a RAID device.
3. After all the legs have been configured, it is time to form the RAID device. This is done using the mdadm utility (i.e., RAID manager utility 429). The exact variant of mdadm to call is determined depending on factors such as the number of legs, whether the md device has been previously created, whether all legs are available or not, and whether replication controller 400 is just upgrading to add a leg that has come back online.
4. After creation of the md device, the mdadm utility is called to record the state of the device in the etcd database (key-value store 430).
5. The md device is formatted with a file system such as, for example, ext4, and mounted in the target directory that is accessible by the pod that will use the device.

NodeUnpublish Volume is an operation used for deprovisioning that does the reverse of NodePublish Volume, e.g.:

1. Unmount the md device from the target directory and remove the target directory.
2. Call the mdadm utility to stop the replication.
3. For each of the legs, call NodeUnpubishVolume on the leg to do any array specific deprovisioning steps to unpublish the volume NodeUnstage Volume is an operation that loops through the legs calling NodeUnstage Volume to do any array specific steps for un-staging the volume, such as unmounting it from the staging location.

RAID monitor 428, in some embodiments, is configured to maintain up-to-date status information about a node's connectivity to storage arrays, and in the case that a connection is dropped, it modifies the md device using the mdadm utility to mark failed devices and remove them from the mirror until connectivity is restored and rebuilds can commence. For example, RAID monitor 428 works in conjunction with CSI node driver component for replication 424 and can have the following functions:

1. Maintain a connection status for the node for each storage array. In one implementation, SDC components are supported. F For example, RAID monitor 428 can use "drv_cfg-query_mdms" and also monitor/var/log/ messages for SDC messages such as "Connected" and "Disconnected" to update connection status. A similar mechanism for NVME/tcp volumes can be implemented in alternative embodiments.

2. If an array transitions to a disconnected state, RAID monitor 428 is configured to attempt to fail that array's devices in any md devices that use it, as well as to remove the array device from the md device (until connectivity is restored). Doing this promptly minimizes the time I/Os remain blocked waiting for completion from both mirror legs. This is desirable to ensure I/O is interrupted for as short a time as possible when a leg is lost.
3. RAID monitor 428 can also inform CSI node driver component for replication 424 when an md device leg fails by calling FailLeg. This in turn transitions the state in the etcd database from "exported" to "degraded".
4. When the array transitions back to the connected state, any removed legs for that array are added back in starting a rebuild operation. A RebuildStart call to CSI node driver component for replication 424 updates the etcd state to "rebuilding".
5. RAID monitor 428 also periodically retrieves "/proc/mdstat" to determine the status of md devices. When a mirror has completed rebuilding, RAID monitor 428 informs CSI node driver component for replication 424 by calling RebuildComplete, which transitions the etcd state back to "exported" if appropriate.

It is to be appreciated that replication controller 400, in some embodiments, is configured to enable expected outcomes when respective failures occur. It is realized that a primary objective of replication driver 420 creating a replicated device (md device) is that it be able to function when one array is down, when one of the clusters is down, or when both an array and a cluster is down.

Therefore, replication controller 400 is able to provision a degraded volume when one of the array's storage class references is offline. That volume will only be using a single leg. When the offline array comes back online, the second leg is automatically added and provisioned so that the volume initiates a rebuild to the new leg and then becomes completely healthy when rebuild completes.

Further, replication controller 400 is able to deprovision a degraded volume when one of its leg arrays is offline. Deprovisioning (including deletion of the volume if it was deleted) is automatically completed when the offline array comes back online.

Still further, replication controller 400 is able to cause a healthy volume that is in use by a pod to transition to a degraded state if a leg is disconnected. If the array is reconnected, a rebuild happens automatically and once the rebuild is completed the volume transitions to exported state.

Accordingly, replication controller 400 enables CSI operations to succeed even if the underlying operations on one leg fail. FIG. 5 illustrates a table 500 with an illustrative set of failure descriptions and outcomes that replication controller 400 executes, facilitates, or otherwise causes.

Consistent with the above-mentioned set of failure descriptions and outcomes, reconciler 426, in some embodiments, is configured to complete the provisioning of partially provisioned volumes when one of the legs comes back online, and completing the deprovisioning of partially deprovisioned volumes when one of the legs comes back online.

Figure 6:
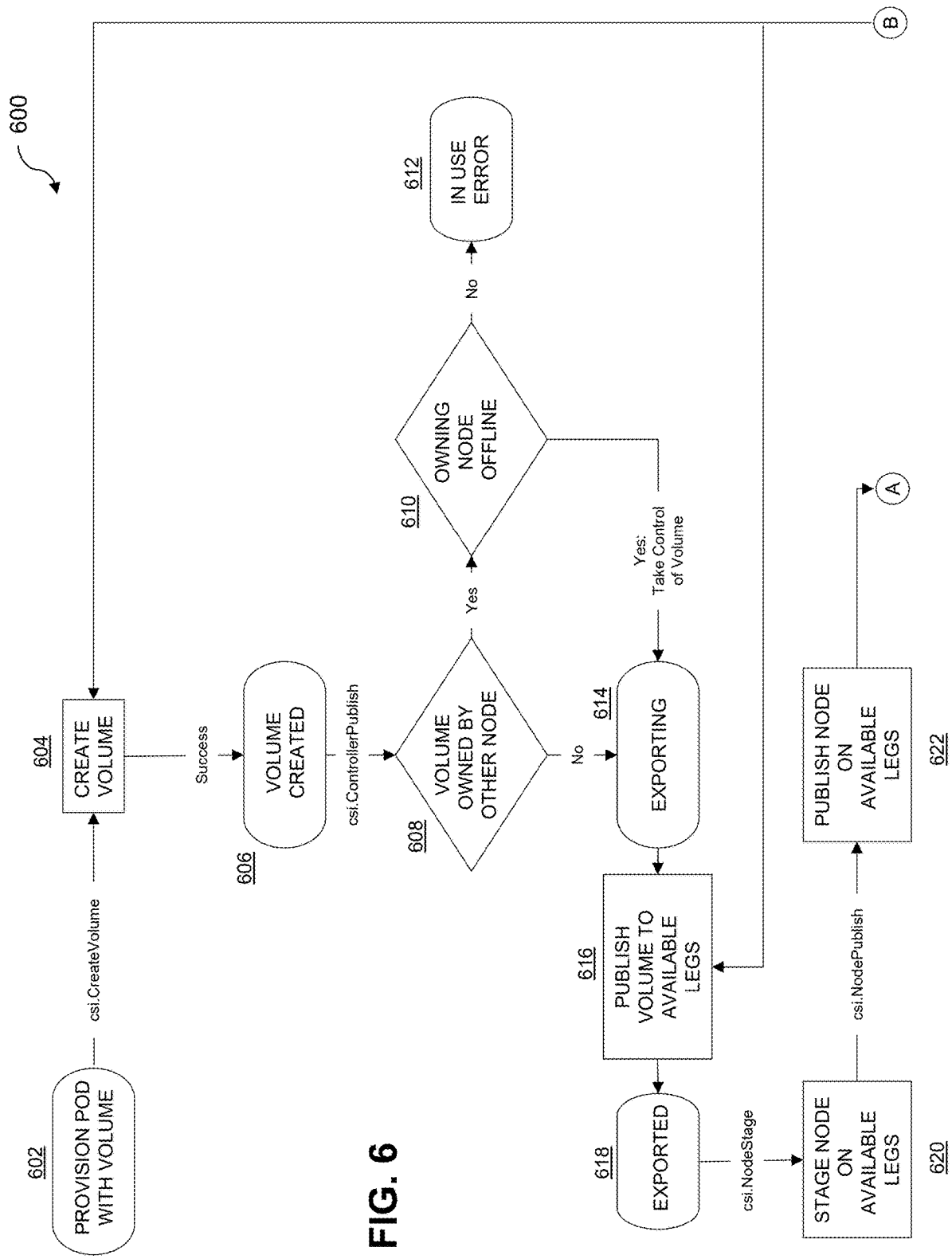
FIG. 6 illustrates a provisioning methodology of a replication controller according to an illustrative embodiment.
Figure 6:
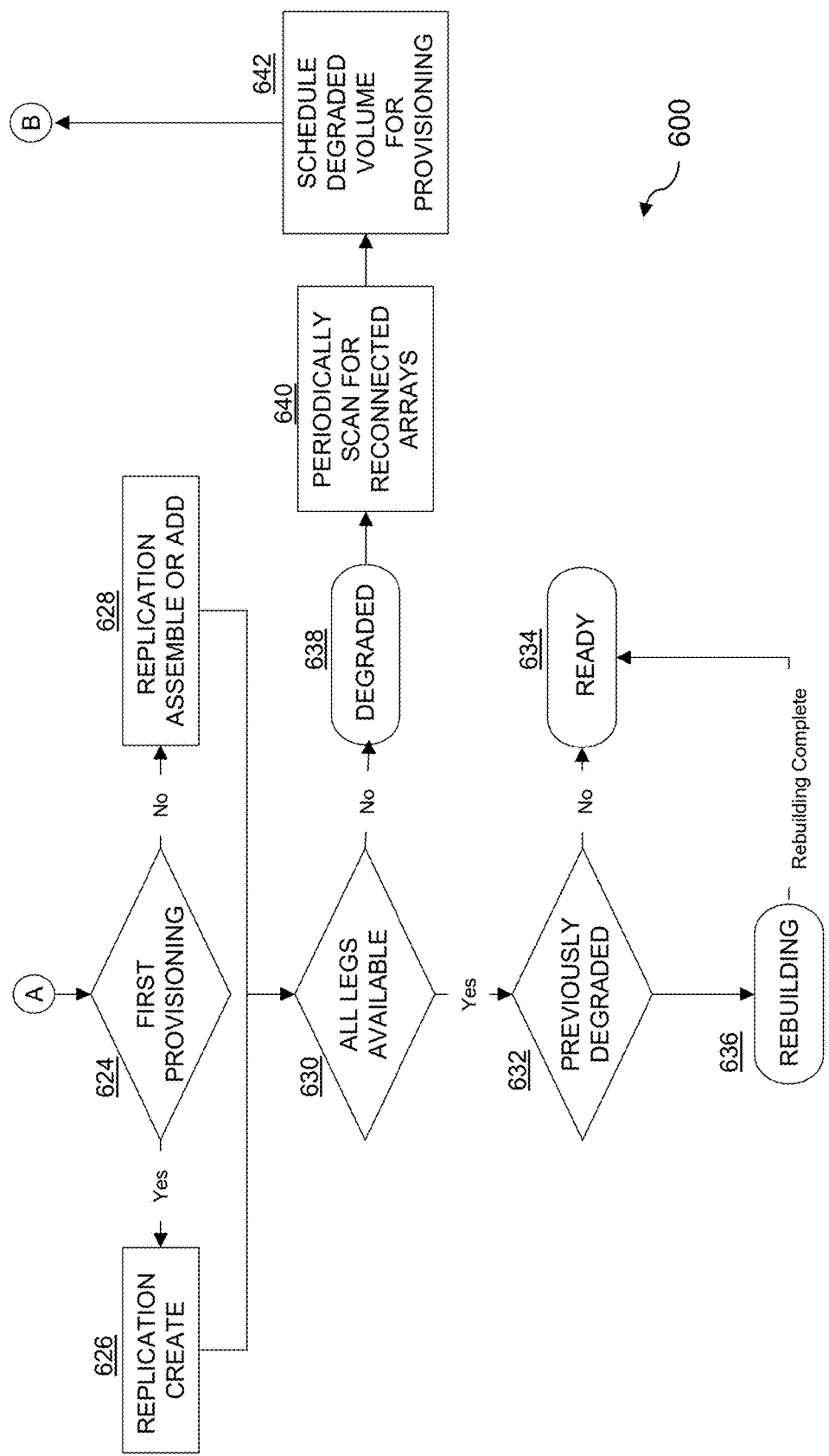

By way of example only, FIG. 6 illustrates a provisioning methodology (process 600) according to an illustrative embodiment. In some embodiments, replication controller 400 is configured to execute process 600. As such, where applicable, the above-mentioned operations of components of replication controller 400 are noted in FIG. 6.

As shown, the process 600 begins with step 602, where a pod is provisioned with a volume. At step 604, a volume creation operation occurs, resulting in a created volume in block 606 which is then published. Advantageously, the volume is created even when one or more legs are disconnected (as long as there is at least one connected leg).

At step 608, it is determined whether or not the volume is owned by another node. If the volume is owned by another node, it is determined if the owning node is offline at step 610. If the owning node is not offline, an in use error is delivered at step 612. If the volume is not owned by another node (step 608), the process 600 proceeds to step 614 for exporting. In addition, if the owning node is offline, the volume is taken control of (hijacked) and the process similarly proceeds to step 614 for exporting.

At step 616, the volume is published to available legs and exported in step 618. The node is staged on available legs at step 620 and then the node is published on available legs at step 622.

Step 624 determines whether this is a first provisioning. If a first provisioning, replication creation occurs at step 626. If not a first provisioning, replication assembly or addition occurs at step 628. Step 630 then determines whether or not all legs are available. If yes, the process proceeds to step 632 to determine whether or not the volume was previously degraded. If no, then the volume is ready in block 634. Otherwise, rebuilding in step 636 is completed and then the volume is ready.

If, however, not all legs are available in step 630, and a currently degraded status exists at block 638, step 640 periodically scans for reconnected arrays. At step 642, the degraded volume is scheduled for provisioning and process 600 returns to steps 604 and 616.

It is to be appreciated that, when one of the provisioning CSI operations is iterating through the legs calling the CSI driver 410 to perform an operation and an error occurs, a determination is made if the error was due to connectivity loss or due to some other reason. This determination is made in a function processLegResult which looks at the error message returned by CSI driver 410 to see if it matches a known message indicating connectivity loss. If the error was due to connectivity loss, the leg state is changed to "disconnected" but the leg error is ignored.

Once all the legs have been processed, a call is made to elect the primary leg electPrimaryLeg. This operation looks to see which legs are disconnected. If there is a leg that is disconnected and no previous primaryLeg has been elected, the first connected leg is elected as the primary leg. Once elected, it will remain as the primary leg until all the legs have become connected again and a rebuild is complete. The primary leg is used as the source volume for any rebuild(s).

If the primary leg becomes disconnected, the provisioning operation will fail as the volume cannot operate without the primary leg. This will put the volume in a state referred to as "primary leg disconnected." Operations on this volume cannot resume until the primary leg is reconnected.

Provisioning operations continue if at least the primary leg provisioning can be completed.

As mentioned above, reconciler 426 periodically looks for volumes with a disconnected leg that needs to be provisioned, and calls ControllerPublish Volume, NodeStage Volume, and NodePublish volume as may be needed to complete the partial provisioning.

Deprovisioning works similarly to the provisioning methodology (process 600), except it calls as needed NodeUnpublish Volume, NodeUnstage Volume, ControllerUnpublish Volume, and if the volume was deleted, Delete Volume.

The deprovisioning process will succeed if one of the legs is disconnected, leaving behind leg artifacts that are eventually cleaned up when the disconnected array(s) come online again.

When a pod is deployed, in accordance with replication controller 400, using one or more volumes on one cluster, once the volume is provisioned and the persistent volume claim (PVC) and persistent volume (PV) have been created, the PVC and PV are optionally replicated to a set of cluster peers as given by an environment variable CLUSTER_PEERS that is passed to the driver. When the PV and PVC are copied to a new cluster, the PV refers to an existing volume so no action is taken on the peer clusters, and the PVC is provisioned against the existing PV (which was created first), so this is similar to statically creating the PVC/PV for an existing array volume. The PVC is created in the same namespace it was in on the original cluster that created the volume.

This behavior saves the user from having to manually copy PVCs and PVs using a command line interface (CLI) tool such as, for example, repctl, although a CLI tool can be incorporated to allow user control.

If the original deployed pod is on a node that fails, that pod will go into a failed state. If that pod was protected by CSM-resiliency (designated by a label on the pod), then the pod would automatically move to a new node in the same cluster if possible.

However, when the entire cluster goes down, a cluster failure model allows the user to simply start the application on a different cluster. In some embodiments, a sequence allowing this to occur is as follows:

1. Assume a pod is provisioned on cluster A node 5. The owner of the volumes for that pod is then A/5. Recall that one cannot provision a volume that one does not own, with the following exception.
2. Each node has an etcd lease maintained by CSI node driver component for replication 424 that indicates that the node is simply alive. Assume the expiration period for that lease is 30 seconds, thus updates are happening every few seconds indicating the node is alive.
3. If the node is down as indicated by the expired lease, and a further check by replication driver 420 to CSI driver 410 for each leg indicates the node is disconnected, a different cluster can determine that the node has died. There is, however, in the case of a transient network error, always a slight possibility of interrupting I/O in the next step.
4. If a user attempts to start the application on a second cluster B, then ControllerPublish Volume will be called to make the volume available to a cluster B node, say B/6. However, it will detect it is not the owner of the volume. ControllerPublish Volume has logic that will look to see if the current owner A/5 has died (by the techniques in step 3. above), and if so it has logic to take control of (hijacked) the volume by unpublishing the volume from the original cluster and then publishing it to the new cluster. It does this simply by calling ControllerUnpublish Volume and assuming that is successful for all (connected) legs, finishing the ControllerPublish Volume request which assigns volume ownership to B/6. This change of ownership for a volume is atomic, in that the etcd lease lock is held for the duration of the ControllerPublish Volume request in cluster 2.
5. Hijacked volumes can be automatically snapshotted. This would involve taking a snap on each (connected) leg of the volume before it is published to the new node, providing a backup of the volume at its last known state on the original node.
6. The rest of publishing logic will complete on cluster B and the pod will become available.
7. When node A/5 restarts, its ControllerPublish operation will be unable to process the volume as it is no longer the owner, and ultimately the user can terminate the pod, or logic can be implemented to detect this situation and terminate the pod redeployment.

In the case of a total loss of the etcd database (key-value store 430), recovery is initiated) by a CLI command that performs various operations in replication driver 420. The CLI command specifies a PV that still exists in one of the clusters for the volume. The PV was annotated with VolumeAttributes when it was initially created that includes the array VolumeId and name for each of the legs.

A recovery algorithm, for each leg, according to an illustrative embodiment:

1. Determines if the leg volumes still existed. This forms the basis for the etcd volume entry.
2. Determine where (to what cluster/node) the leg volumes were exported (if any).
3. Assuming that state was consistent, and the volume was exported, contact replication driver 420 on the owning node and determine if the volume was completely exported and provisioned, and fill in the rest of the volume state from the observed information on the node.
4. If the volume was not exported, then the etcd volume would indicate that with no owner for the volume.
5. Assuming the information was consistent, persist a new entry for the volume in the etcd database.

Advantageously, in accordance with the implementation of replication controller 400, an application is immune from a storage system failure (without application restart), or a node failure (with application restart on a different node), or a simultaneous storage system and node failure (with application restart on a different node).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement replication functionality will now be described in greater detail with reference to FIGS. 5 and 6. Although described in the context of systems and processes of FIGS. 1-6, these platforms may also be used to implement at least portions of other information processing systems in other embodiments.

Figure 7:
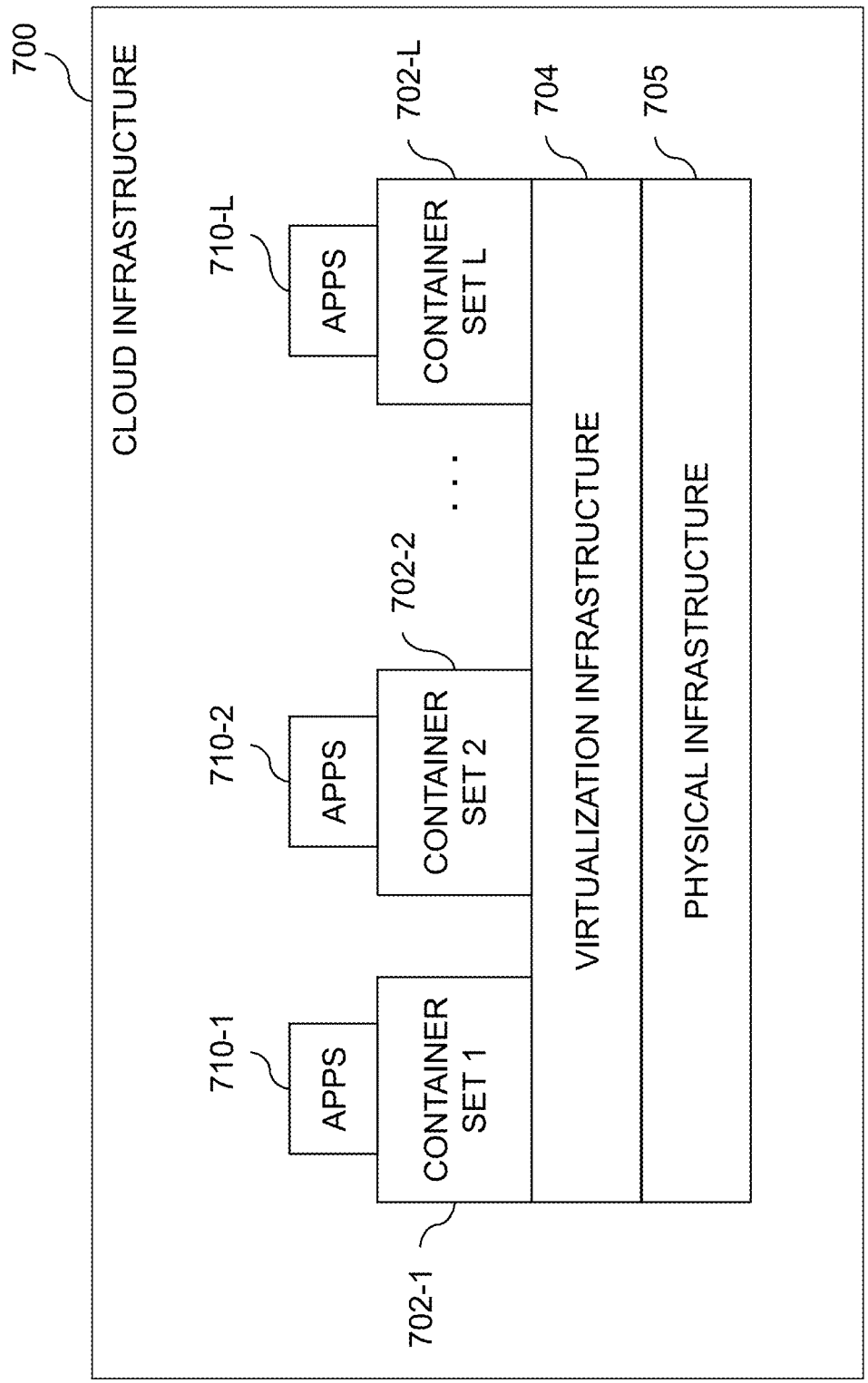
FIGS. 7 and 8 show examples of processing platforms that may be utilized to implement at least a portion of an information processing system with replication functionalities according to an illustrative embodiment.

FIG. 7 shows an example processing platform comprising cloud infrastructure 700. The cloud infrastructure 700 comprises a combination of physical and virtual processing resources that may be utilized to implement at least a portion of the information processing system environments described herein. The cloud infrastructure 700 comprises multiple container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure.

The cloud infrastructure 700 further comprises sets of applications 710-1, 710-2, . . . 710-L running on respective ones of the container sets 702-1, 702-2, ... 702-L under the control of the virtualization infrastructure 704. The container sets 702 may comprise respective sets of one or more containers.

In some implementations of the FIG. 7 embodiment, the container sets 702 comprise respective containers implemented using virtualization infrastructure 704 that provides operating system level virtualization functionality, such as support for Kubernetes-managed containers.

Figure 8:
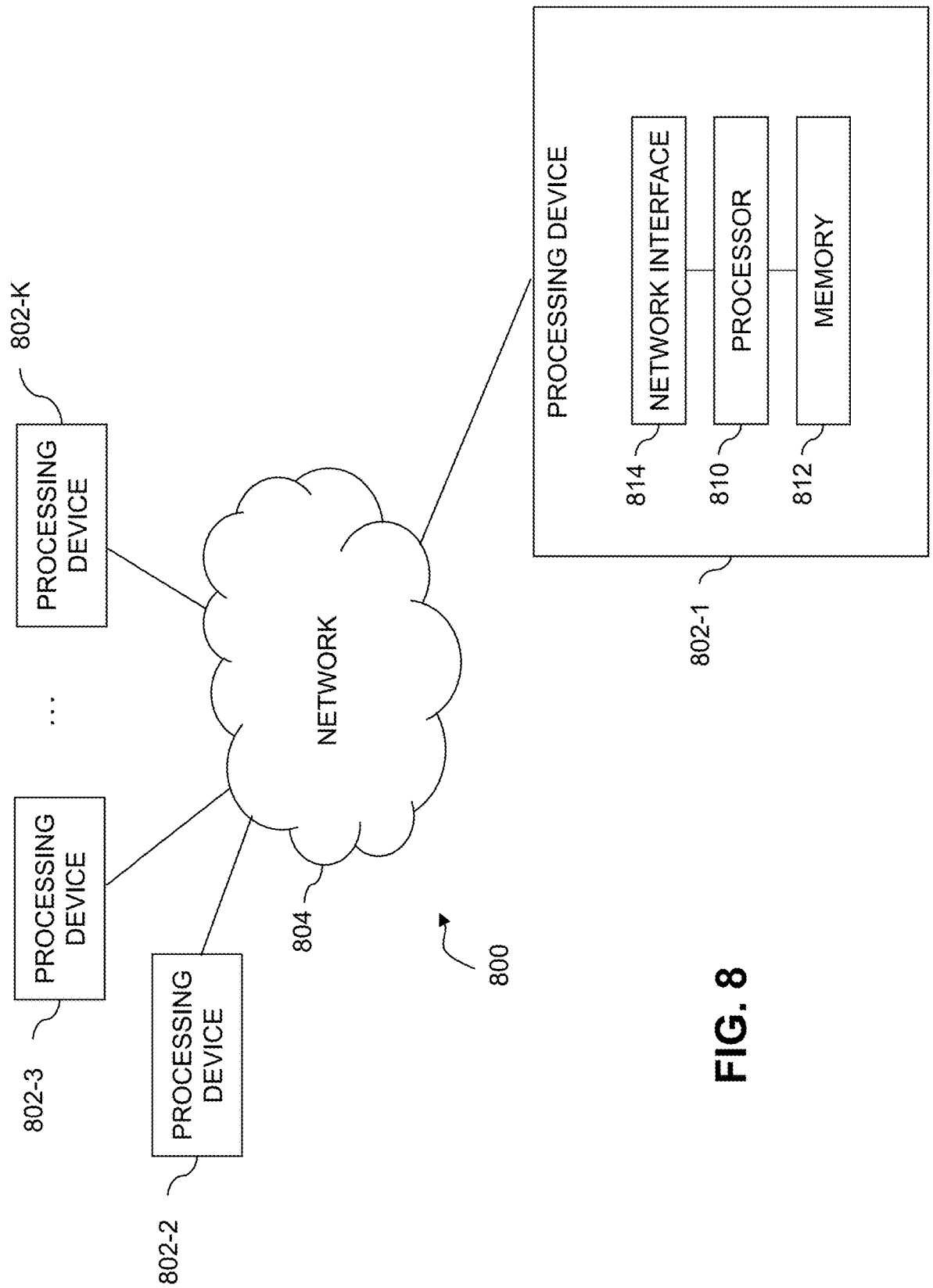

As is apparent from the above, one or more of the processing modules or other components of systems 100, 200, 300, and 400 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of information processing system environments described herein and includes a plurality of processing devices, denoted 802-1, 802-2, 802-3, ... 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and systems and processes of FIGS. 1-6 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system environment as disclosed herein can be implemented at least in part in the form of one or more software programs stored in memory and executed by a processor of a processing device. For example, at least portions of the functionality as disclosed herein are illustratively implemented in the form of software running on one or more processing devices.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to at least one memory, the at least one processing platform, when executing program code, is configured to implement a replication controller in a storage environment, wherein the replication controller, using host-based replication, is configured to:
   provision one or more volumes that are synchronously replicated across at least two storage arrays, wherein the provisioning is configured to maintain access to the one or more volumes by an application program executing on a host device in response to one of the at least two storage arrays failing, wherein the failure of the one of the at least two storage arrays is transparent to the application program executing on the host device while access to the one or more volumes is maintained, and wherein the replication controller comprises:

at least one storage specific container storage interface driver configured to manage the at least two storage arrays; and a replication driver operatively coupled to the at least one storage specific container storage interface driver and configured to provision the one or more synchronously replicated volumes in conjunction with the at least one storage specific container storage interface driver, wherein the replication driver comprises at least one reconciler and at least one redundant array of independent disks monitor, and wherein the at least one reconciler and the at least one redundant array of independent disks monitor copy any missing data to the failed storage array when it returns online.

2. The apparatus of claim 1, wherein the replication controller is implemented on the host device.

3. The apparatus of claim 1, wherein the replication controller comprises a first driver component configured to manage one or more controller-specific operations and a second driver component configured to manage one or more node-specific operations.

4. The apparatus of claim 3, wherein the at least one storage specific container storage interface driver comprises a first driver component configured to manage one or more controller-specific operations and a second driver component configured to manage one or more node-specific operations, wherein the first driver component of the at least one storage specific container storage interface driver and the first driver component of the replication driver are configured to make function calls to one another, and wherein the second driver component of the at least one storage specific container storage interface driver and the second driver component of the replication driver are configured to make function calls to one another.

5. The apparatus of claim 3, wherein the replication controller further comprises a storage array monitor module configured to maintain and make available, to driver components of the replication controller, information associated with statuses of the at least two storage arrays.

6. The apparatus of claim 3, wherein the replication controller further comprises a reconciler module configured to manage provisioning and deprovisioning of the one or more volumes when a failed storage array becomes available.

7. The apparatus of claim 1, wherein the replication controller is further configured to provision a volume as one of the one or more volumes when a node owning the volume is determined to be offline.

8. The apparatus of claim 1, wherein the at least two storage arrays comprise storage arrays of the same storage type.

9. The apparatus of claim 1, wherein the at least two storage arrays comprise storage arrays of different storage types.

10. A method comprising:

provisioning, via a replication controller using host-based replication in a storage environment, one or more volumes that are synchronously replicated across at least two storage arrays, wherein the provisioning is configured to maintain access to the one or more volumes by an application program executing on a host device in response to one of the at least two storage arrays failing, wherein the failure of the one of the at least two storage arrays is transparent to the application program executing on the host device while access to the one or more volumes is maintained, and wherein the replication controller comprises:

at least one storage specific container storage interface driver configured to manage the at least two storage arrays; and a replication driver operatively coupled to the at least one storage specific container storage interface driver and configured to provision the one or more synchronously replicated volumes in conjunction with the at least one storage specific container storage interface driver, wherein the replication driver comprises at least one reconciler and at least one redundant array of independent disks monitor, and wherein the at least one reconciler and the at least one redundant array of independent disks monitor copy any missing data to the failed storage array when it returns online;

wherein the replication controller is implemented on a processing platform comprising at least one processor, coupled to at least one memory, executing program code.

11. The method of claim 10, further comprising:
implementing the replication controller on the host device.

12. The method of claim 10, further comprising:
managing one or more controller-specific operations with a first driver component of the replication controller; and
managing one or more node-specific operations with a second driver component of the replication controller.

13. The method of claim 12, further comprising:
managing one or more controller-specific operations with a first driver component of the at least one storage specific container storage interface driver; and
managing one or more node-specific operations with a second driver component of the at least one storage specific container storage interface driver;
wherein the first driver component of the at least one storage specific container storage interface driver and the first driver component of the replication driver are configured to make function calls to one another; and
wherein the second driver component of the at least one storage specific container storage interface driver and the second driver component of the replication driver are configured to make function calls to one another.

14. The method of claim 12, further comprising:
maintaining and making available to the first and second driver components of the replication controller, information associated with statuses of the at least two or more storage arrays, with a storage array monitor module of the replication controller.

15. The method of claim 12, further comprising:
managing provisioning and deprovisioning of the one or more volumes when a failed storage array becomes available with a reconciler module of the replication controller.

16. The method of claim 10, further comprising:
provisioning a volume as one of the one or more volumes when a node owning the volume is determined to be offline with the replication controller.

17. A computer program product comprising a non-transitory processor-readable storage medium having stored therein program code of one or more software programs, wherein the program code when executed by at least one processing platform causes the at least one processing platform to:

provision, via a replication controller using host-based replication in a storage environment, one or more volumes that are synchronously replicated across at least two storage arrays, wherein the provisioning is configured to maintain access to the one or more volumes by an application program executing on a host device in response to one of the at least two storage arrays failing, wherein the failure of the one of the at least two storage arrays is transparent to the application program executing on the host device while access to the one or more volumes is maintained, and wherein the replication controller comprises:
   at least one storage specific container storage interface driver configured to manage the at least two storage arrays; and
   a replication driver operatively coupled to the at least one storage specific container storage interface driver and configured to provision the one or more synchronously replicated volumes in conjunction with the at least one storage specific container storage interface driver, wherein the replication driver comprises at least one reconciler and at least one redundant array of independent disks monitor, and wherein the at least one reconciler and the at least one redundant array of independent disks monitor copy any missing data to the failed storage array when it returns online.

18. The computer program product of claim 17, wherein the program code when executed by at least one processing platform further causes the at least one processing platform to: implement the replication controller on the host device.

19. The computer program product of claim 17, wherein the program code when executed by at least one processing platform further causes the at least one processing platform to:
   manage one or more controller-specific operations with a first driver component of the replication controller; and
   manage one or more node-specific operations with a second driver component of the replication controller.

20. The computer program product of claim 19, wherein the program code when executed by at least one processing platform further causes the at least one processing platform to:
   manage one or more controller-specific operations with a first driver component of the at least one storage specific container storage interface driver; and
   manage one or more node-specific operations with a second driver component of the at least one storage specific container storage interface driver;
   wherein the first driver component of the at least one storage specific container storage interface driver and the first driver component of the replication driver are configured to make function calls to one another; and
   wherein the second driver component of the at least one storage specific container storage interface driver and the second driver component of the replication driver are configured to make function calls to one another.

* * * * *